(12) United States Patent
Matsushima

(10) Patent No.: US 12,360,433 B2
(45) Date of Patent: Jul. 15, 2025

(54) ELECTRONIC DEVICE AND CONTROL METHOD

(71) Applicant: CANON KABUSHIKI KAISHA, Tokyo (JP)

(72) Inventor: Shuichiro Matsushima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 18/181,883

(22) Filed: Mar. 10, 2023

(65) Prior Publication Data
US 2023/0259004 A1 Aug. 17, 2023

(30) Foreign Application Priority Data
Mar. 17, 2022 (JP) .................. 2022-042780

(51) Int. Cl.
*G03B 7/04* (2021.01)
*G05G 5/03* (2008.04)
*H04N 23/62* (2023.01)

(52) U.S. Cl.
CPC .............. *G03B 7/04* (2013.01); *G05G 5/03* (2013.01); *H04N 23/62* (2023.01); *G05G 2505/00* (2013.01)

(58) Field of Classification Search
CPC .. G06F 3/016; G03B 2217/002; H04N 23/57; H04N 23/62; G05G 1/08; G05G 5/03
See application file for complete search history.

(56) References Cited

U.S. PATENT DOCUMENTS

| 5,448,334 A * | 9/1995 | Kaihara | ................. G03B 7/091 |
| | | | 396/297 |
| 2012/0287328 A1* | 11/2012 | Kawai | ...................... G03B 3/10 |
| | | | 348/E5.042 |
| 2019/0121525 A1* | 4/2019 | Tokiwa | ................. G06F 3/0487 |

FOREIGN PATENT DOCUMENTS

| JP | 2005136654 A | 5/2005 |
| JP | 2012155674 A | 8/2012 |
| JP | 2013-083866 A | 5/2013 |
| JP | 2015153576 A | 8/2015 |

OTHER PUBLICATIONS

The above U.S. Patent Application Publication #1 was cited in an Aug. 9, 2023 Great Britain Search Report, which issued in Great Britain Patent Application No. 2302437.5.
The above foreign patent documents were cited in the Mar. 1, 2024 Japanese Office Action, which is enclosed without an English Translation, that issued in Japanese Patent Application No. 2022-042780.

\* cited by examiner

*Primary Examiner* — Noam Reisner
(74) *Attorney, Agent, or Firm* — Cowan, Liebowitz & Latman, P.C.

(57) ABSTRACT

An electronic device comprises a rotational operation member and a control unit that controls an angle of rotation at which to generate a clicking sensation in the rotational operation member. The control unit controls the angle of rotation based on a division of a setting to be changed in accordance with a rotational operation of the rotational operation member.

15 Claims, 9 Drawing Sheets

FIG. 3

| LEVEL 1/3 SETTING | LEVEL 1/2 SETTING |
|---|---|
| ... | ... |
| 1/1000 | 1/1000 |
| 1/800 | — |
| — | 1/750 |
| 1/640 | — |
| 1/500 | 1/500 |
| 1/400 | — |
| — | 1/350 |
| 1/320 | — |
| 1/250 | 1/250 |
| 1/200 | — |
| — | 1/180 |
| 1/160 | — |
| 1/125 | 1/125 |
| ... | ... |

IMAGE SHOOTING STANDBY SCREEN

MENU SCREEN

SCREEN FOR SETTING Tv VALUE LEVEL

Tv VALUE SETTING SCREEN (LEVEL 1/3 SETTING)

Tv VALUE SETTING SCREEN (LEVEL 1/2 SETTING)

ELECTRONIC DEVICE AND CONTROL METHOD

BACKGROUND OF THE INVENTION

Field of the Invention

The present invention relates to an electronic device and a control method for an electronic device.

Description of the Related Art

Rotational operation members, such as dials, are commonly used as operation members for operating and changing settings of an electronic device. Some rotational operation members are provided with a mechanism that allows a user to tactually sense a response (a clicking or detent sensation (feeling)) from the rotational operation member at the time of rotation by applying a mechanical vibration or rotational resistance for each predetermined rotation amount or for rotation in a predetermined direction (Japanese Patent Laid-Open No. 2013-83866).

However, in a case where a clicking sensation is provided to the rotational operation member at each predetermined angle of rotation as in Japanese Patent Laid-Open No. 2013-83866, even when changing, for example, from a first setting value to a second setting value, an amount of rotation of the rotational operation member from the first setting value to the second setting value and a clicking sensation that a user experiences change depending on the number and positions of and intervals between (division of) values that can be set between the first setting value and the second setting value, thereby possibly causing the user to experience a sense of unnaturalness when the user performs the operation.

SUMMARY OF THE INVENTION

The present invention has been made in consideration of the aforementioned problems, and realizes techniques for reducing a sense of unnaturalness of an operation according to a clicking sensation that a user receives from a rotational operation member.

In order to solve the aforementioned problems, the present invention provides an electronic device comprising: a rotational operation member; and a control unit configured to control an angle of rotation at which to generate a clicking sensation in the rotational operation member, wherein the control unit controls the angle of rotation based on a division of a setting to be changed in accordance with a rotational operation of the rotational operation member.

In order to solve the aforementioned problems, the present invention provides a method of controlling an electronic device including a rotational operation member comprising: controlling an angle of rotation at which to generate a clicking sensation in the rotational operation member, wherein the control step controls the angle of rotation based on a division of a setting to be changed in accordance with a rotational operation of the rotational operation member.

In order to solve the aforementioned problems, the present invention provides a non-transitory computer-readable storage medium storing a program for causing a processor to function as an electronic device comprising: a rotational operation member; and a control unit configured to control an angle of rotation at which to generate a clicking sensation in the rotational operation member, wherein the control unit controls the angle of rotation based on a division of a setting to be changed in accordance with a rotational operation of the rotational operation member.

According to the present invention, it is possible to ameliorate a sense of unnaturalness of an operation according to a clicking sensation that a user receives from a rotational operation member.

Further features of the present invention will become apparent from the following description of exemplary embodiments (with reference to the attached drawings).

BRIEF DESCRIPTION OF THE DRAWINGS

FIG. 3 is a diagram illustrating a table in which shutter speed setting values of the present embodiment are stored.

DESCRIPTION OF THE EMBODIMENTS

Figure 1:
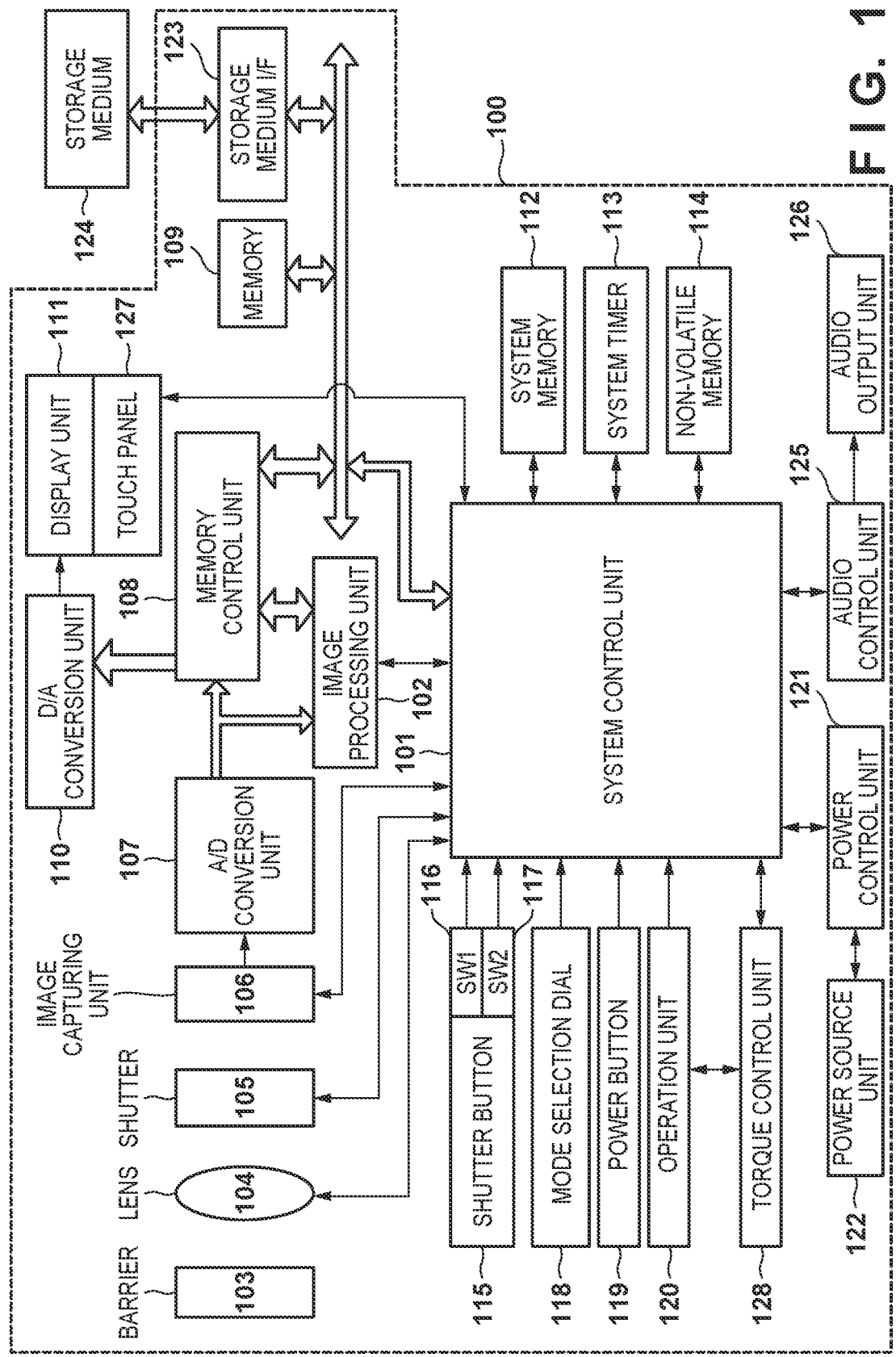
FIG. 1 is a block diagram illustrating a configuration of a digital camera according to the present embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the following, an embodiment in which an electronic device of the present invention is applied to an image capturing apparatus, such as a digital camera, will be described in detail with reference to the accompanying drawings. The electronic device of the present invention is not limited to the image capturing apparatus and is applicable to, for example, an apparatus comprising an operation member that is, in any way, capable of rotational operation (hereinafter, rotational operation member), such as a tablet PC or smartphone. Further, the present invention is also applicable to a mouse for operating an information processing apparatus, such as a desktop PC; a remote control unit for remotely operating an electronic device; and the like.

<Apparatus Configuration>

First, a configuration and functions of the digital camera of the present embodiment will be described with reference to FIGS. 1 and 2.

Figure 2:
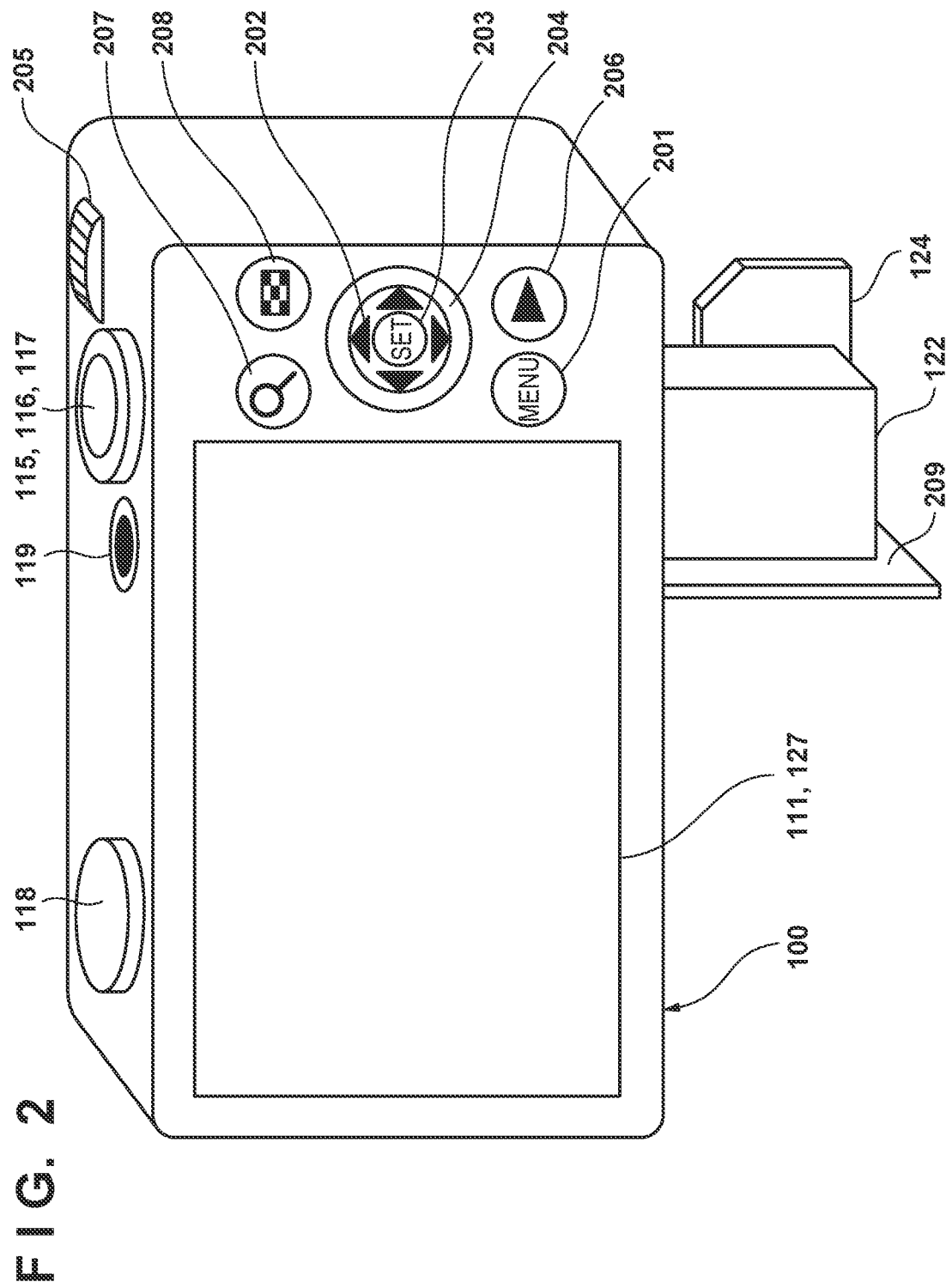
FIG. 2 is an external view of the digital camera according to the present embodiment.

FIG. 1 is a block diagram illustrating a configuration of the digital camera according to the present embodiment. FIG. 2 is an external view of the digital camera according to the present embodiment.

An image shooting lens 104 is a group of lenses including a zoom lens and a focus lens. A shutter 105 is a shutter provided with an aperture function. An image capturing unit 106 is an image sensor comprising a CCD, CMOS, or the like for converting an optical image into an electric signal. An A/D conversion unit 107 converts an analog signal into a digital signal. The A/D conversion unit 107 is used for converting an analog signal outputted from the image capturing unit 106 to a digital signal. A barrier 103 prevents an image capturing system including the image shooting lens 104, the shutter 105, and the image capturing unit 106 from getting dirty or damaged by covering the image capturing system including the image shooting lens 104 of a digital camera 100.

An image processing unit 102 performs predetermined pixel interpolation; resizing processing, such as reduction; and color conversion processing on data from the A/D conversion unit 107 or data from a memory control unit 108. In the image processing unit 102, predetermined computational processing is performed using captured image data, and a system control unit 101 performs exposure control and distance measuring control based on the obtained computational result. Through-the-lens (TTL) type automatic focus (AF) processing, automatic exposure (AE) processing, and pre-flash (EF) processing are thus performed. Furthermore, in the image processing unit 102, predetermined computational processing is performed using captured image data, and TTL type automatic white balance (AWB) processing is performed based on the obtained computational result.

Output data from the A/D conversion unit 107 is directly written into a memory 109 via the image processing unit 102 and the memory control unit 108 or via the memory control unit 108. The memory 109 stores image data obtained by the image capturing unit 106 and then converted into digital data by the A/D conversion unit 107 and image data for display on a display unit 111. The memory 109 has sufficient storage capacity for storing a predetermined number of still images and a predetermined amount of time of a moving image and audio. The memory 109 also serves as a memory (video memory) for image display.

A D/A conversion unit 110 converts data for image display stored in the memory 109 into an analog signal and supplies it to the display unit 111. The data for image display written in the memory 109 is thus displayed by the display unit 111 via the D/A conversion unit 110.

The display unit 111 performs a display in accordance with an analog signal from the D/A conversion unit 110 on a display device, such as a liquid crystal or organic EL display device. The display unit 111 functions as an electronic viewfinder (EVF) and displays a through image (live view image) by a digital signal which has been A/D-converted once by the A/D conversion unit 107 and stored in the memory 109, being D/A-converted into an analog signal by the D/A conversion unit 110, and the analog signal being successively transferred to and displayed on the display unit 111.

A non-volatile memory 114 is an electrically-erasable/recordable memory, and an EEPROM or the like, for example, is used. The non-volatile memory 114 stores constants, programs, and the like for operation of the system control unit 101. Here, the programs are for executing various flowcharts to be described later in the present embodiment.

The system control unit 101 includes a processor that controls the entire digital camera 100. The system control unit 101 realizes each of processes of the present embodiment to be described later by executing the programs stored in the non-volatile memory 114. A RAM is used for a system memory 112. In the system memory 112, constants, variables, programs read from the non-volatile memory 114 for operation of the system control unit 101, and the like are loaded. The system control unit 101 also performs display control by controlling the memory 109, the D/A conversion unit 110, the display unit 111, and the like.

A system timer 113 is a time measuring unit for measuring time to be used for various kinds of control and time of a built-in clock.

A shutter button 115, a mode selection dial 118, a power button 119, and an operation unit 120 are operation members for inputting various operation instructions to the system control unit 101.

The mode selection dial 118 is an operation member for inputting an operation instruction for switching an operation mode of the system control unit 101 to a still image shooting mode, a moving image recording mode, a reproduction mode, and a detailed mode included in each operation mode.

A first shutter switch 116 is turned on by a so-called half-press (image shooting preparation instruction), which is halfway through an operation of the shutter button 115 provided in the digital camera 100, and generates a first shutter switch signal SW1. Operations, such as, automatic focus (AF) processing, automatic exposure (AE) processing, automatic white balance (AWB) processing, and pre-flash (EF) processing, are started by the first shutter switch signal SW1.

A second shutter switch 117 is turned on by a so-called full press (image shooting instruction), which is completion of an operation of the shutter button 115, and generates a second shutter switch signal SW2. The system control unit 101 starts a series of image shooting processing operations from readout of a signal from the image capturing unit 106 to writing of image data to a storage medium 124 in accordance with the second shutter switch signal SW2.

A power control unit 121 is comprised of a battery detection circuit, a DC-DC converter, a switching circuit for switching among blocks to be energized, and the like and detects a state of the power button 119, whether a battery is mounted, a type of battery, and a remaining amount of battery. In addition, the power control unit 121 supplies a necessary voltage to each component including the storage medium 124 for a necessary period by controlling the DC-DC converter based on the detection result and an instruction of the system control unit 101.

A power source unit 122 is a primary battery, such as an alkaline battery or lithium battery, and a secondary battery, such as an NiCd battery, NiMH battery, or Li ion battery, but may also be an AC adaptor or the like.

A storage medium interface (I/F) 123 is an interface with the storage medium 124, such as a memory card or hard disk. The storage medium 124 is a storage medium, such as a memory card for recording a shot image, and is comprised of a semiconductor memory, magnetic disk, or the like.

An audio control unit 125 converts audio data inputted by a microphone or the like into a digital signal and stores it in the storage medium 124 as well as reads audio data stored in the storage medium 124 and outputs it from an audio output unit 126, such as a speaker. The audio control unit 125 can record audio data in synchronization with moving image data in a moving image recording mode and record audio data to be attached to still image data in the still image shooting mode. The audio control unit 125 can generate audio data for issuing a notification, such as a warning, and sound it from the audio output unit 126.

Each operation member of the operation unit 120 is appropriately assigned a function for each situation, for example, by an operation of selecting from various function icons displayed on the display unit 111 and acts as various function buttons. Function buttons include, for example, an end button, return button, image feed button, jump button, narrow-down button, attribute change button, and the like. For example, when a menu button 201 illustrated in FIG. 2 is pressed, a menu screen allowing various settings is displayed on the display unit 111. The user can intuitively perform various settings using the menu screen displayed on the display unit 111 and a directional button 202 provided with buttons in four directions of up, down, left, and right and a set button 203.

A controller wheel 204 and an electronic dial 205 are rotational operation members included in the operation unit 120 and are used together with the directional button, for example, for when instructing a selection item.

The electronic dial 205 includes a torque control unit 128 for variably controlling vibration or rotational resistance (torque) to be applied to the electronic dial 205 for each predetermined direction and angular position so that the user can tactually sense a response (a clicking or detent sensation (feeling)) from the electronic dial 205 at the time of rotation. The predetermined direction and predetermined angular position correspond to, for example, a direction in which a setting value, which has been assigned for each predetermined angular position, increases or decreases and the number and positions of and intervals between (division of) values that can be set. The torque control unit 128 includes a small motor connected to a rotational shaft of the electronic dial 205 and an encoder that detects an angle of rotation of the rotational shaft of the electronic dial 205 and changes a clicking sensation to be produced when the electronic dial 205 is rotated by changing a magnitude of a torque of the motor in accordance with the angle of rotation of the electronic dial 205. For example, when rotating the electronic dial 205 in a direction away from a predetermined position, the response from the electronic dial 205 will feel heavy to the user due to the torque of the motor being applied in a direction opposite to a direction of rotation of the electronic dial 205, and when rotating the electronic dial 205 in a direction approaching the predetermined position, the response from the electronic dial 205 that the user feels will be an attraction toward the predetermined position due to the torque of the motor being applied in the same direction as the direction of rotation. In a case where a predetermined position is provided at every predetermined angle, if torque control for when the motor is rotated is performed smoothly and continuously, the user can tactually sense a clicking sensation at each predetermined angle as the response at the time of rotation of the electronic dial 205. Further, it is possible to change a strength (intensity) of the clicking sensation by changing the torque of the motor. In this case, when a predetermined angle or predetermined position is defined as a click angle, it is possible to electrically variably control the click angle of the electronic dial 205. The method of providing a clicking sensation to the electronic dial 205 in the present embodiment is not limited to the above-described method and may be, for example, a method described in Japanese Patent Laid-Open No. 2013-83866 or another method.

A bottom surface portion of the digital camera 100 is provided with a housing unit for the power source unit 122 and the storage medium 124 which can be opened and closed by a cover 209, and the power source unit 122 and the storage medium 124 can be attached to or detached from the digital camera 100 by opening and closing the cover.

A reproduction button 206 can switch between the camera's image shooting mode and reproduction mode. In the reproduction mode, when an enlargement button 207 is pressed in a state where one image is displayed on the display unit 111, the image displayed on the display unit 111 can be displayed in an enlarged manner, and when the enlargement button 207 is pressed a plurality of times, an enlargement magnification of the image increases in accordance with the number of presses. By operating the directional button 202, the controller wheel 204, and the electronic dial 205 an enlarged state, it is possible to move an enlarged range displayed on the display unit 111. Further, by pressing a reduction button 208 in the enlarged state of the image, it is possible to reduce the enlargement magnification of the enlarged image. When the reduction button 208 is pressed in a state in which one image is displayed on the display unit 111, so-called index reproduction in which a plurality of reduced images are displayed at once on the display unit 111 is performed. When the reduction button 208 is pressed a plurality of times, the number of images to be displayed at a time increases in accordance with the number of presses. Also, in an index reproduction state, a currently-selected current image is indicated by a cursor being displayed in a periphery of a reduced image. At this time, by operating the directional button 202, the controller wheel 204, and the electronic dial 205, it is possible to change the current image. In addition, the number of images of the change from the current image due to one rotational operation may be changed according to a setting. When the enlargement button 207 is pressed in the index reproduction state, it is possible to reduce the number of images to be displayed on the display unit 111.

A touch panel 127 capable of detecting contact with the display unit 111 is provided as part of the operation unit 120. The touch panel 127 and the display unit 111 may be integrally formed. For example, the touch panel 127 is configured such that its light transmittance does not interfere with display of the display unit 111 and so as to be mounted on an upper layer of a display surface of the display unit 111. In addition, input coordinates on the touch panel 127 are associated with display coordinates on the display unit 111. This makes it possible to configure a graphical user interface (GUI) in which it appears as though the user is able to directly operate a screen displayed on the display unit 111. The system control unit 101 can detect the following operations on the touch panel: touching of the touch panel with a finger or pen (hereinafter, touch-down), a state in which the touch panel is being touched with a finger or pen (hereinafter, touch-on), moving of a finger or pen while touching the touch panel (hereinafter, move), lifting of a finger or pen that has been touching the touch panel (hereinafter, touch-up), and a state in which nothing is touching the touch panel (hereinafter, touch-off). These operations and positional coordinates on which a finger or pen is touching the touch panel are notified to the system control unit 101 via an internal bus, and the system control unit 101 determines what type of operation has been performed on the touch panel based on the notified information. Regarding the move, it is also possible to determine a direction of movement of a finger or pen moving on the touch panel for each of a vertical component and horizontal component on the touch panel based on a change of positional coordinates. In addition, it is assumed that a stroke has been drawn when a touch-up is performed after a touch-down and a certain move are performed on the touch panel. The operation of quickly drawing a stroke is called a flick. The flick is an operation of moving a finger quickly over a certain distance while touching the touch panel, and then simply lifting the finger, and in other words, is an operation of swiftly performing a trace over the touch panel as though flicking with a finger. When it is detected that a move has been performed a predetermined distance or more at a predetermined speed or more, directly followed by a touch-up, it can be determined that a flick has been performed. In addition, assume that it is determined that a drag has been performed when it is detected that a move has been performed for a predetermined distance or more at a predetermined speed or less. It is also possible to detect an operation of entering a specific area while moving a finger or pen on the touch panel (hereinafter, move-in) and an operation of exiting a specific area while moving (hereinafter, move-out). Any of various types of touch panel, such as a resistive film, surface acoustic wave, electrostatic capacitance, infrared, electromagnetic induction, image recognition, or optical sensor touch panel, may be used as the touch panel.

<Method of Setting Click Angle>

Next, a method of setting a click angle according to the present embodiment will be described with reference to FIGS. 3 and 4.

In the present embodiment, a method in which when shutter speed setting levels are different, an amount of rotation of the electronic dial 205 necessary for changing a setting value in each setting level is equivalent regardless of the setting level, will be described.

FIG. 3 illustrates part of a table in which setting values for each shutter speed setting level are stored.

It is possible to select level 1/3 or 1/2 for the shutter speed setting level. Level 1 setting values, which are representative values (in the example of FIG. 3, 1/1000, 1/500, 1/250, and 1/125 second), are values that are in common between levels 1/3 and 1/2. As illustrated in FIG. 3, values between the level 1 setting values vary depending on the setting level, and the number of values, intervals therebetween, and positions thereof also vary.

Figure 4A:
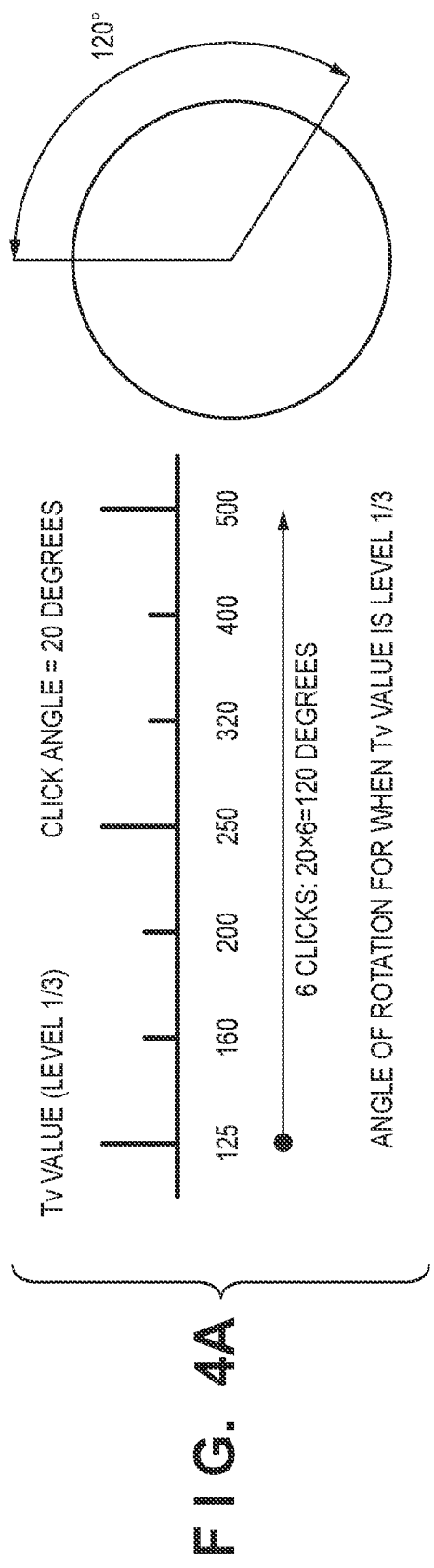
FIGS. 4A and 4B are diagrams illustrating a method of setting a click angle according to the present embodiment.
Figure 4B:
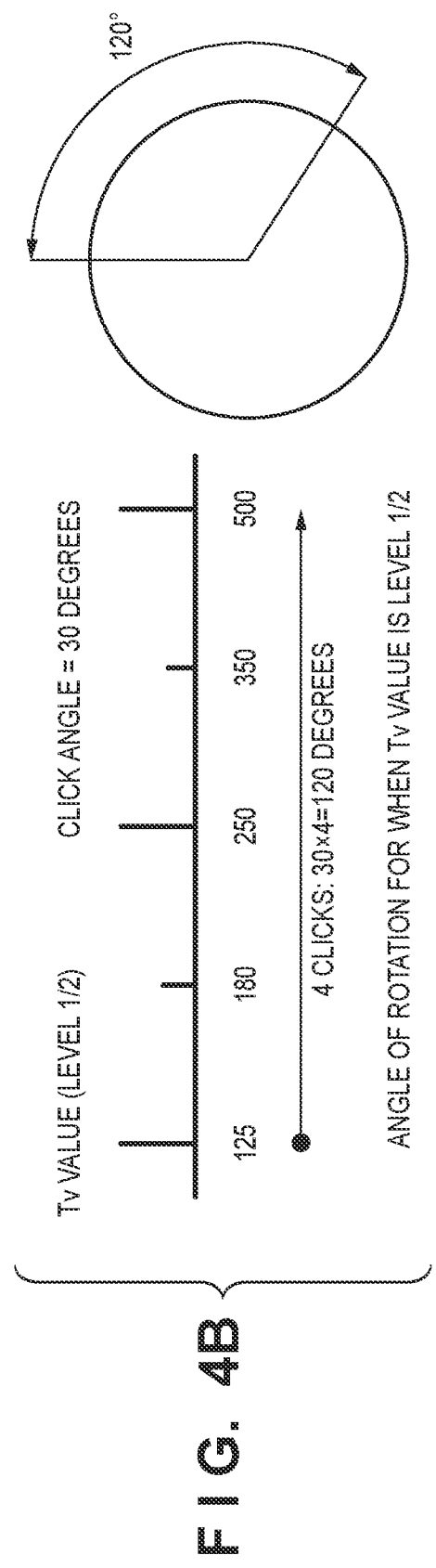

FIGS. 4A and 4B are diagrams illustrating a method of setting a click angle according to the present embodiment.

In the present embodiment, a click angle is set for the electronic dial 205, and each time the user rotates the electronic dial 205 by the click angle, the electronic dial 205 assumes a mechanically-stable position, and thereby the rotation of the electronic dial 205 can be caused to stop. In this case, each time the electronic dial 205 moves one stop position of a click angle, a setting value is changed by one step.

Here, a method of setting a click angle for when the electronic dial 205 is rotated to change a setting value (Tv value) of the shutter speed from 1/125 second to 1/500 second will be described as an example. As illustrated in FIG. 4A, when the click angle is set to 20 degrees, when the shutter speed setting level is level 1/3, it is necessary to change the setting value by six steps toward the high-speed shutter side. In this case, it is possible to make six steps' worth of change by rotating the electronic dial 205 120 degrees. In contrast, when the shutter speed setting level is level 1/2, in order to change the setting value of the shutter speed from 1/125 second to 1/500 second, it is necessary to make four steps' worth of change, and the angle of rotation of the electronic dial 205 would be 80 degrees. When the amount of rotation of the electronic dial 205 necessary for changing the setting value of the shutter speed to the same value thus varies depending on the shutter speed setting level, the user's operational experience can be negatively impacted.

Therefore, in the present embodiment, the angle of rotation of the electronic dial 205 necessary for changing a shutter speed setting is controlled to be the same regardless of the setting level (setting division). Specifically, when an angle of rotation for when the shutter speed setting level is level 1/3 (first division) is set to be a first angle and an angle of rotation for when shutter speed setting level is level 1/2 (second division) is set to be a second angle, the angle of rotation is changed so that a value for which the first angle is multiplied by the number of setting values that can be set in the first division and a value for which the second angle is multiplied by the number of setting values that can be set in the second division are equivalent.

In the example of FIGS. 4A and 4B, the click angle is set such that a value for which the number of steps and the click angle at the time of rotation of the electronic dial 205 are multiplied, that is, a total angle of rotation, is the same. This makes it possible for the amount of rotation of the electronic dial 205 necessary for changing the shutter speed setting value to the same value (changing the Tv value from 1/125 second to 1/500 second) to be equivalent regardless of the shutter speed setting level. In the present embodiment, as illustrated in FIG. 4B, by changing the click angle in a case of the level 1/2 setting to 30 degrees, the total angle of rotation for four steps, which is the setting value for when changing the Tv value from 1/125 second to 1/500 second, can be made to be 120 degrees which is the same as in the case of the level 1/3 setting.

Thus, by making the value obtained by multiplying the number of setting values that can be set and the click angle in level 1/3 setting equivalent to the value obtained by multiplying the number of setting values that can be set and the click angel in level 1/2 setting in the case where the range of setting values that can be set is the same for the shutter speed setting level 1/3 and level 1/2, it is possible to set the amount of rotation of the electronic dial 205 to be equivalent regardless of the setting level. Further, by setting the click angle such that the value obtained by multiplying the number of setting values that can be set and the click angle in respective setting levels is 360, the amount of rotation for making a change within a range of settable setting values will be 360 degrees, that is, within a single full-rotation operation, thereby making it possible to change a setting without performing multiple full-rotation operations.

In a case where the number of setting values for each setting level is determined in advance as in the above-described shutter speed setting levels, the click angle of the rotational operation member, such as the electronic dial 205, need only be stored as a predetermined constant for each setting level. In addition, in a case where the level of or intervals between setting values dynamically change, the click angle may be calculated in accordance with that change.

<Processing for Setting Click Angle>

Next, processing for setting a click angle in accordance with the shutter speed setting level will be described with reference to FIGS. 5 to 8.

Figure 5:
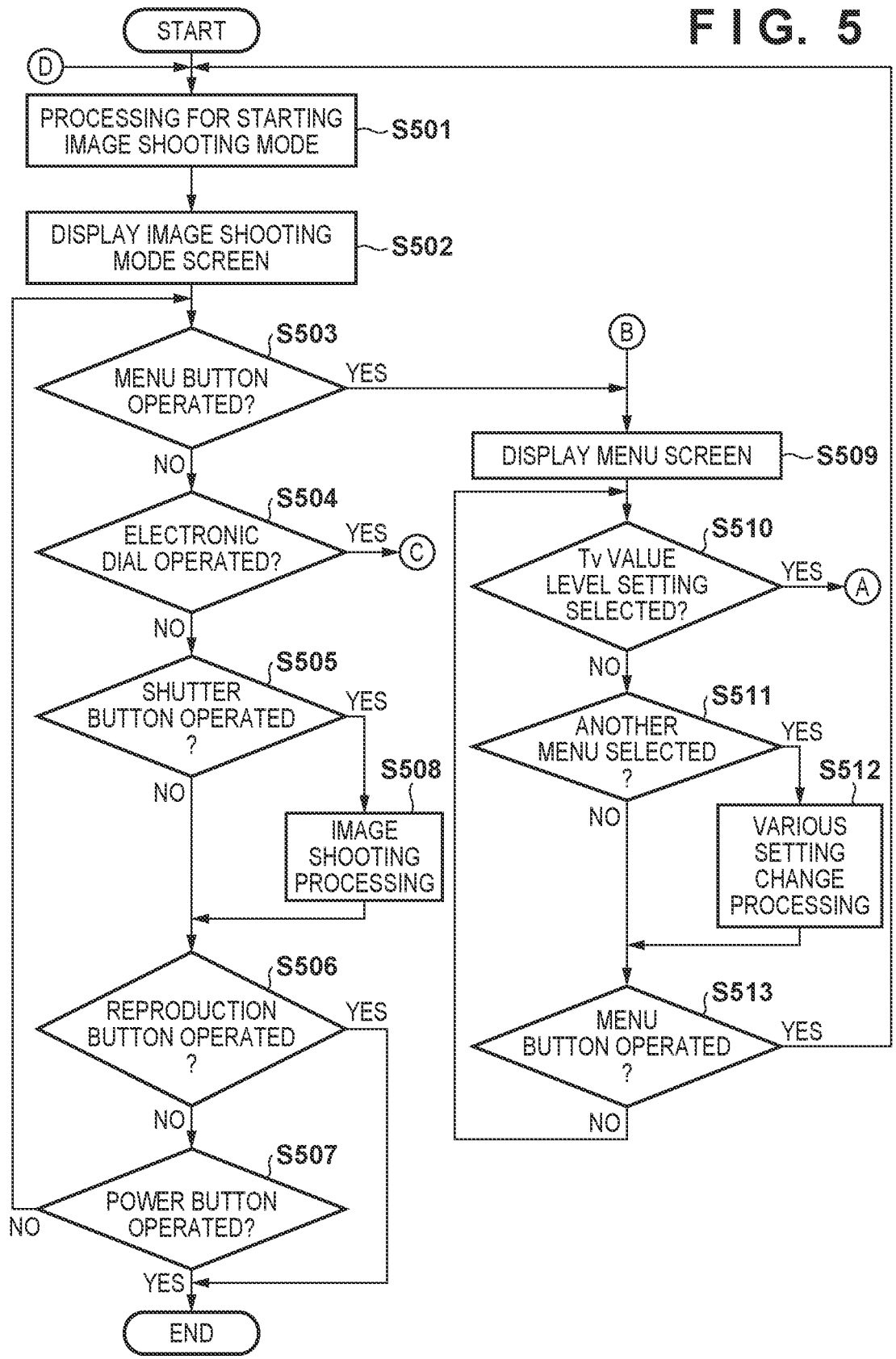
FIG. 5 is a flowchart illustrating processing for setting a click angle based on a shutter speed setting level at the time of an image shooting mode according to the present embodiment.
Figure 6:
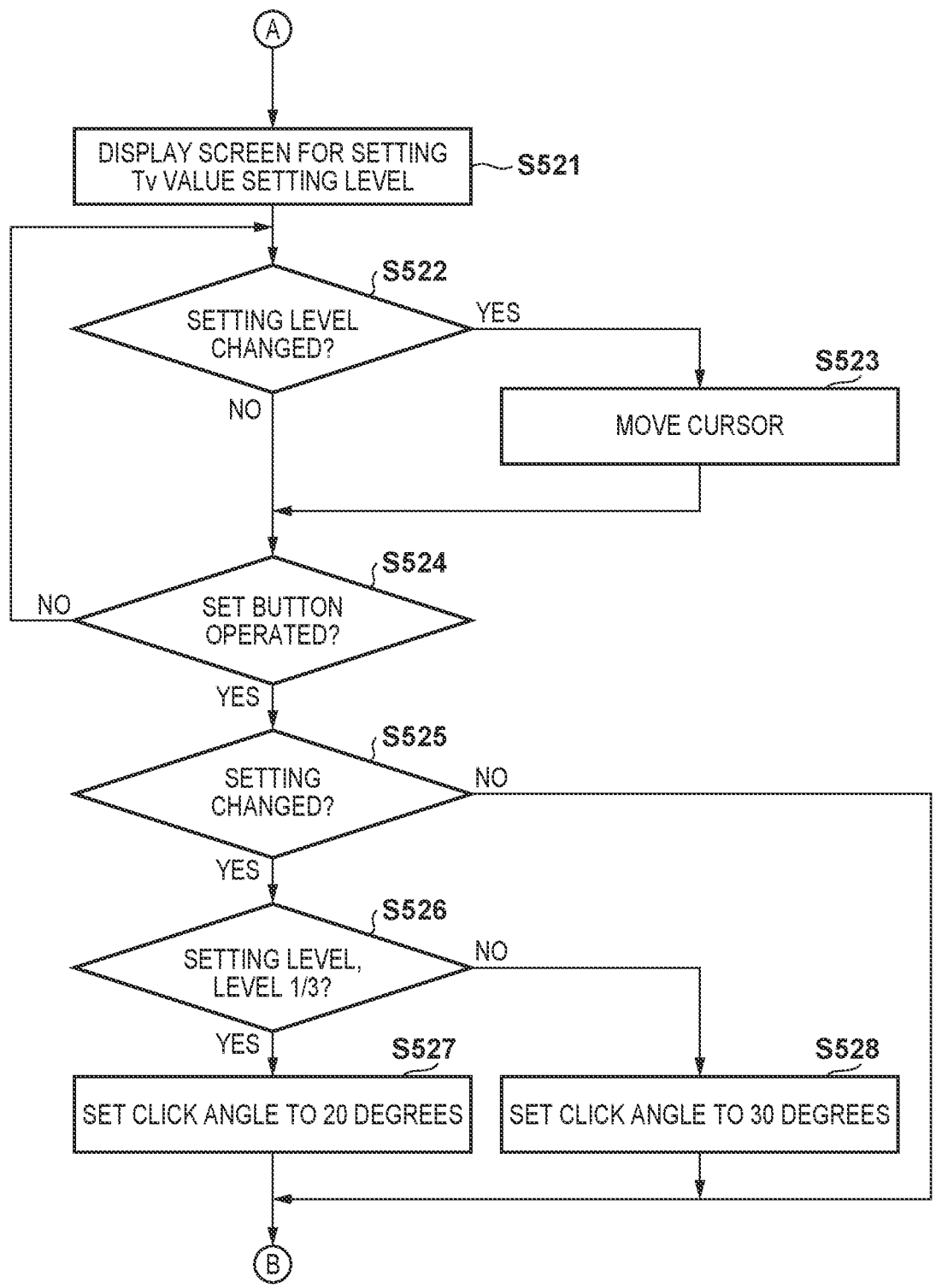
FIG. 6 is a flowchart illustrating processing for setting a click angle based on a shutter speed setting level at the time of the image shooting mode according to the present embodiment.
Figure 7:
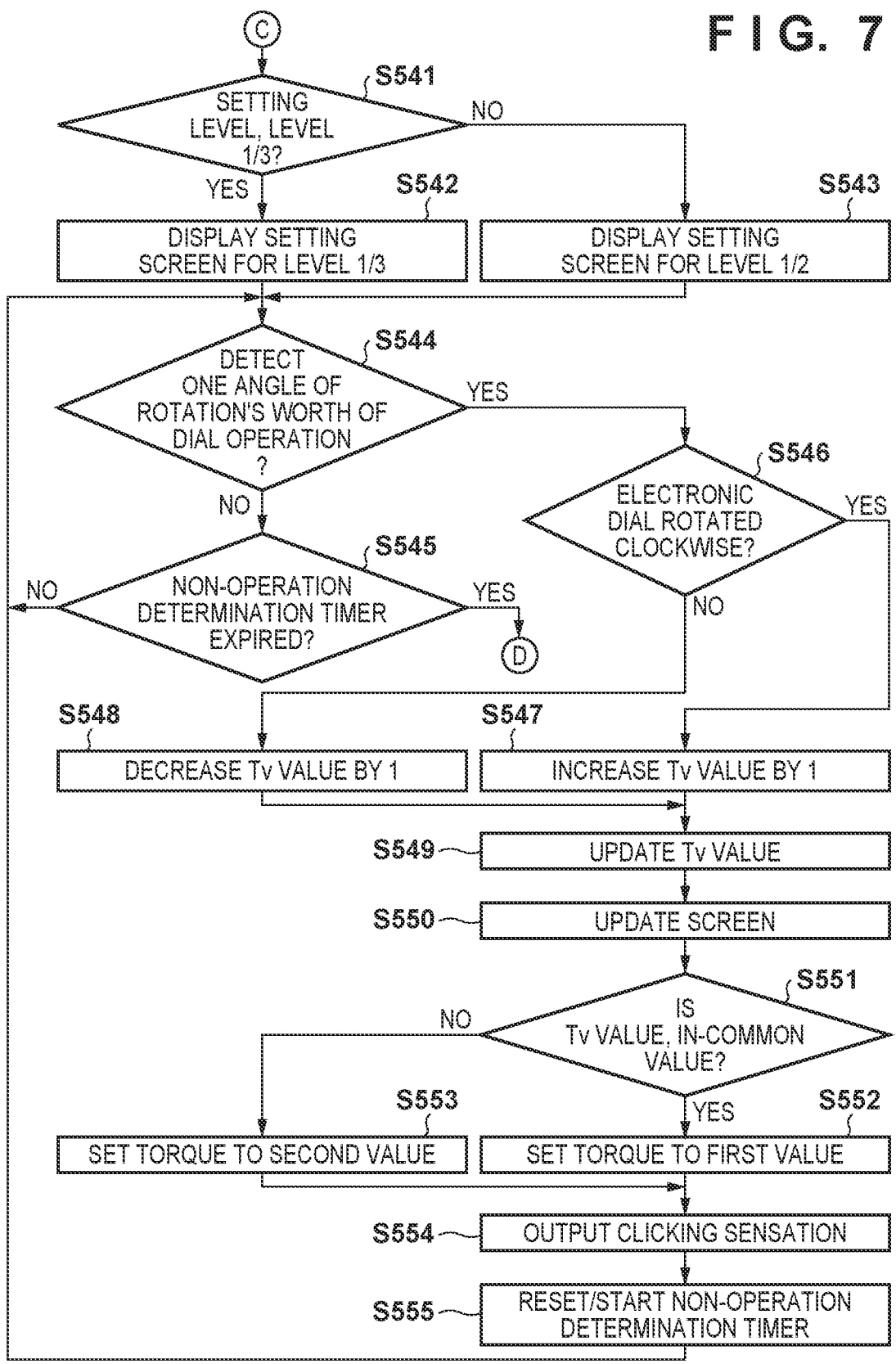
FIG. 7 is a flowchart illustrating processing for setting a click angle based on a shutter speed setting level at the time of the image shooting mode according to the present embodiment.

FIGS. 5 to 7 are flowcharts illustrating processing for setting a click angle in accordance with the shutter speed setting level at the time of the image shooting mode according to the present embodiment. FIGS. 8A to 8E are diagrams illustrating examples of UI screens in the processing for setting a click angle in accordance with the shutter speed setting level at the time of the image shooting mode according to the present embodiment.

The processing from FIG. 5 to FIG. 7 is realized by the system control unit 101 controlling each component of the digital camera 100 by executing a program stored in the non-volatile memory 114. Further, the processing of FIG. 5 to FIG. 7 is started when the power of the digital camera 100 is turned on and the operation mode of the system control unit 101 is set to the still image shooting mode.

In step S501, the system control unit 101 executes processing for starting the still image shooting mode. In the processing for starting the still image shooting mode, parameters necessary for image shooting are initialized and setting values stored in the non-volatile memory 114 are read out.

Figure 8A:
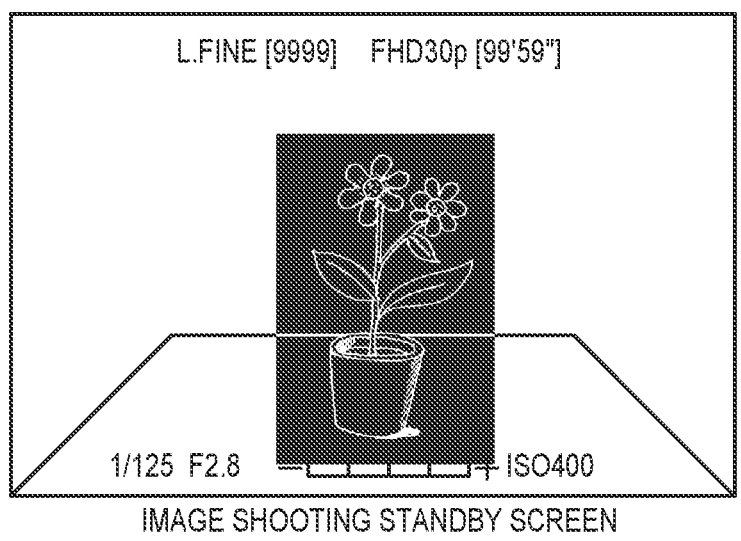
FIGS. 8A to 8E are diagrams illustrating examples of UI screens in the processing for setting a click angle based on a shutter speed setting level at the time of the image shooting mode according to the present embodiment.

In step S502, the system control unit 101 displays an image shooting standby screen on the display unit 111. FIG. 8A illustrates the image shooting standby screen in the still image shooting mode. A live view image and image shooting parameters, such as a shutter speed, are displayed on the image shooting standby screen of the still image shooting mode.

In step S503, the system control unit 101 determines whether the menu button 201 has been operated. When the system control unit 101 determines that the menu button 201 has been operated, the system control unit 101 advances the processing to step S509. When the system control unit 101 determines that the menu button 201 has not been operated, the system control unit 101 advances the processing to step S504.

In step S504, the system control unit 101 determines whether the electronic dial 205 has been operated. When the system control unit 101 determines that the electronic dial 205 has been operated, the system control unit 101 advances the processing to step S541 of FIG. 7. When the system control unit 101 determines that the electronic dial 205 has not been operated, the system control unit 101 advances the processing to step S505.

In step S505, the system control unit 101 determines whether the shutter button 115 has been operated. When the system control unit 101 determines that the shutter button 115 has been operated, the system control unit 101 advances the processing to step S508. When the system control unit 101 determines that the shutter button 115 has not been operated, the system control unit 101 advances the processing to step S506.

In step S506, the system control unit 101 determines whether the reproduction button 206 has been operated. When the system control unit 101 determines that the reproduction button 206 has been operated, the system control unit 101 ends the processing so as to transition to the reproduction mode. When the system control unit 101 determines that the reproduction button 206 has not been operated, the system control unit 101 advances the processing to step S507.

In step S507, the system control unit 101 determines whether the power button 119 has been operated. When the system control unit 101 determines that the power button 119 has been operated, the system control unit 101 ends the processing so as to perform power-off processing. When the system control unit 101 determines that the power button 119 has not been operated, the system control unit 101 returns the processing to step S503.

The processing from step S503 to step S507 is processing for monitoring the user operation and is repeatedly executed during image shooting standby in the image shooting mode.

Next, processing in accordance with the user operation from step S503 to step S507 will be described.

In step S508, the system control unit 101 executes processing for shooting a still image. In the processing for shooting a still image, processing for generating an image of a predetermined format from a captured video signal and recording the image as a file on the storage medium 124 is performed.

Figure 8B:
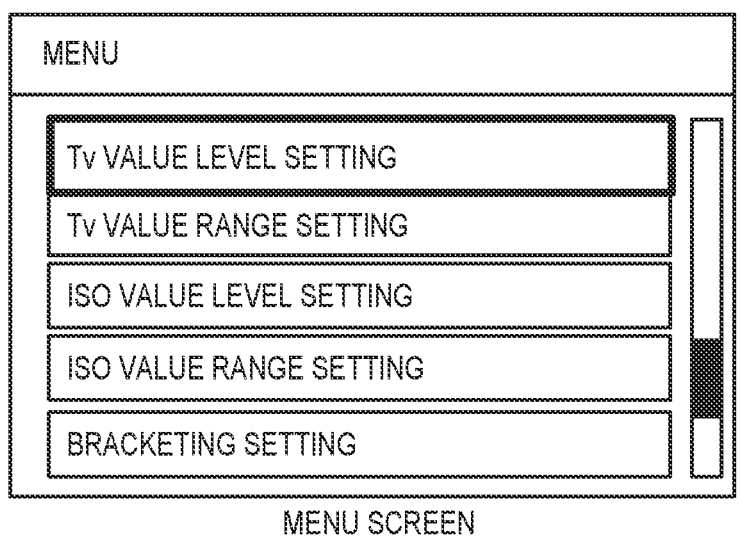

In step S509, the system control unit 101 displays a menu screen on the display unit 111. FIG. 8B illustrates the menu screen.

In step S510, the system control unit 101 determines whether a shutter speed level setting has been selected in the menu screen of FIG. 8B. When the system control unit 101 determines that the shutter speed level setting has been selected, the system control unit 101 advances the processing to step S521 of FIG. 6. When the system control unit 101 determines that the shutter speed level setting has not been selected, the system control unit 101 advances the processing to step S511.

In step S511, the system control unit 101 determines whether another setting menu has been selected. When the system control unit 101 determines that another setting menu has been selected, the system control unit 101 advances the processing to step S512. When the system control unit 101 determines that another setting menu has not been selected, the system control unit 101 advances the processing to step S513.

In step S512, the system control unit 101 performs processing in accordance with the menu item selected in the menu screen of FIG. 8B.

In step S513, the system control unit 101 determines whether the menu button 201 has been operated again while the menu screen of FIG. 8B is being displayed. When the system control unit 101 determines that the menu button 201 has been operated, the system control unit 101 returns the processing to step S501, ends the display of the menu screen, and returns to the image shooting standby state. When the system control unit 101 determines that the menu button 201 has not been operated, the system control unit 101 returns the processing to step S510 and repeatedly executes the processing for monitoring the user operation for the menu screen from step S510.

Next, processing for when the shutter speed level setting has been selected in the menu screen of FIG. 8B in step S510 of FIG. 5 will be described with reference to FIG. 6.

Figure 8C:
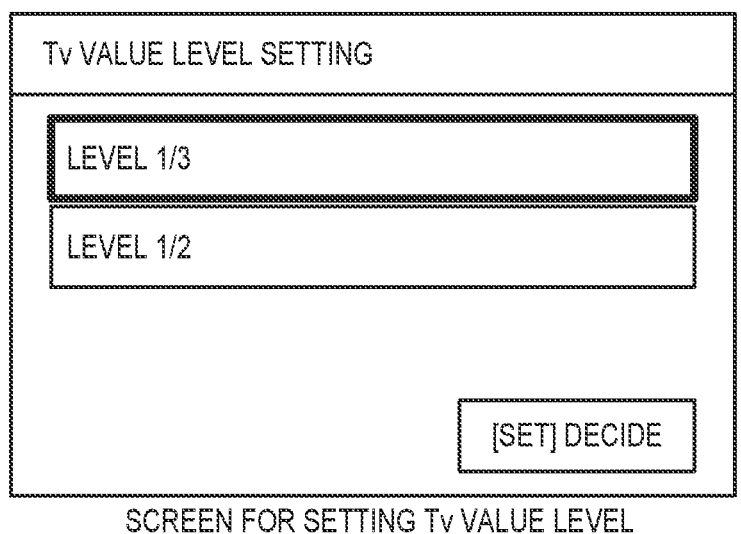

In step S521, the system control unit 101 displays a screen for setting the shutter speed setting level on the display unit 111. FIG. 8C illustrates a screen for setting the shutter speed setting level. In the setting screen of FIG. 8C, it is possible to change the setting to level 1/3 or 1/2 as the shutter speed setting level.

In step S522, the system control unit 101 determines whether the setting level has been changed in the screen for setting the shutter speed setting level of FIG. 8C. When the system control unit 101 determines that the setting level has been changed, the system control unit 101 advances the processing to step S523, and when the system control unit 101 determines that the setting level has not been changed, the system control unit 101 advances the processing to step S524.

In step S523, the system control unit 101 moves a cursor position to the setting level to which the change has been made in the screen for setting the shutter speed setting level of FIG. 8C.

In step S524, the system control unit 101 determines whether the set button has been operated in the screen for setting the shutter speed setting level of FIG. 8C. When the system control unit 101 determines that the set button has been operated, the system control unit 101 advances the processing to step S525. When the system control unit 101 determines that the set button has not been operated, the system control unit 101 returns the process to step S522 and repeatedly executes the processing for monitoring the user operation for the screen for setting the shutter speed setting level of FIG. 8C from step S522.

In step S525, the system control unit 101 determines whether the setting change for the shutter speed setting level has been completed. When the system control unit 101 determines that the setting change for the shutter speed setting level has been completed, the system control unit 101 advances the processing to step S526. When the system control unit 101 determines that the setting change for the shutter speed setting level has not been completed, the system control unit 101 returns the processing to step S509 and repeatedly executes the processing for monitoring the user operation for the menu screen from step S509.

In step S526, the system control unit 101 determines the setting level to which the setting change has been made; when the system control unit 101 determines that the setting level is level 1/3, the system control unit 101 advances the processing to step S527, and when the system control unit 101 determines that the setting level is level 1/2, the system control unit 101 advances the processing to step S528.

In step S527, since the setting level is level 1/3, the system control unit 101 sets the click angle of the electronic dial 205 to 20 degrees as described in FIG. 4A, returns the processing to step S509, and repeatedly executes the processing for monitoring the user operation for the menu screen from step S509.

In step S528, since the setting level is level 1/2, the system control unit 101 sets the click angle of the electronic dial 205 to 30 degrees as described in FIG. 4B, returns the processing to step S509, and repeatedly executes the processing for monitoring the user operation for the menu screen from step S509.

Next, the processing for changing the shutter speed setting for when the electronic dial 205 is operated in step S504 of FIG. 5 will be described with reference to FIG. 7.

In step S541, the system control unit 101 determines the shutter speed setting level; when the system control unit 101 determines that the setting level is level 1/3, the system control unit 101 advances the processing to step S542, and when the system control unit 101 determines that the setting level is level 1/2, the system control unit 101 advances the processing to step S543.

Figure 8D:
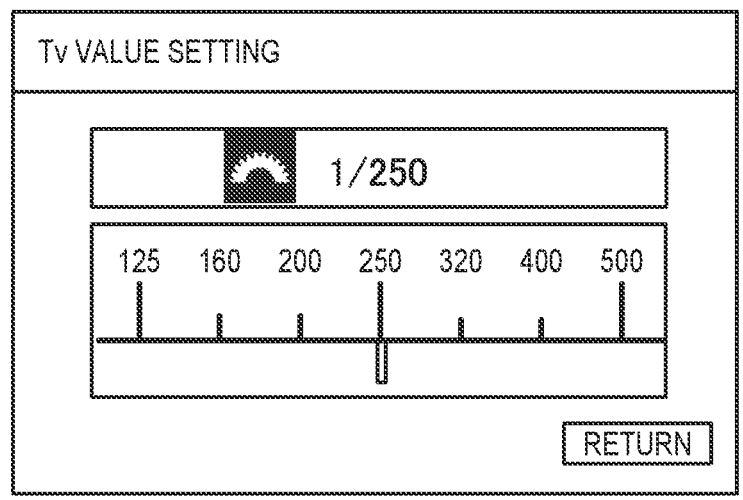

In step S542, since the setting level is level 1/3, the system control unit 101 displays the setting screen for level 1/3 on the display unit 111. FIG. 8D illustrates a screen for setting the level 1/3 shutter speed. In the setting screen of FIG. 8D, it is possible to generate a clicking sensation at the click angle that corresponds to a level 1/3 setting division as well as change the Tv value to a value in accordance with the rotational operation of the electronic dial 205.

Figure 8E:
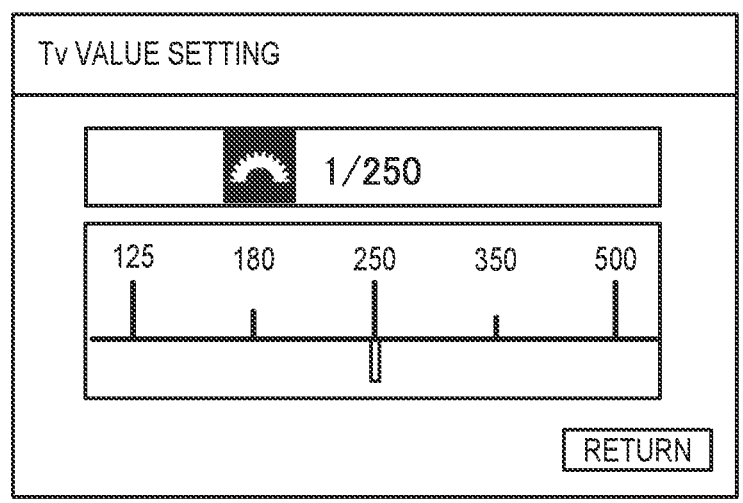

In step S543, since the setting level is level 1/2, the system control unit 101 displays the setting screen for level 1/2 on the display unit 111. FIG. 8E illustrates a screen for setting the level 1/2 shutter speed. In the setting screen of FIG. 8E, it is possible to generate a clicking sensation at the click angle that corresponds to a level 1/2 setting division as well as change the Tv value to a value in accordance with the rotational operation of the electronic dial 205.

In step S544, the system control unit 101 determines whether it has been detected by the torque control unit 128 that an operation to rotate the electronic dial 205 by the currently set one click angle has been performed. When the system control unit 101 determines that an operation to rotate the electronic dial 205 by the currently set one click angle has been detected by the torque control unit 128, the system control unit 101 advances the processing to step S546. When the system control unit 101 determines that an operation to rotate the electronic dial 205 by the currently set one click angle has not been detected by the torque control unit 128, the system control unit 101 advances the processing to step S545.

In step S546, the system control unit 101 determines a direction of rotation of the electronic dial 205. When the system control unit 101 determines that the direction of rotation of the electronic dial 205 is a first direction (clockwise), the system control unit 101 advances the processing to step S547. When the system control unit 101 determines that the direction of rotation of the electronic dial 205 is a second direction (counterclockwise), which is opposite to the first direction, the system control unit 101 advances the processing to step S548.

In the present embodiment, in a case that the shutter speed setting level is level 1/3, the click angle is set to 20 degrees, and in a case that the shutter speed setting level is level 1/2, the click angle is set to 30 degrees. In a case that the direction of rotation of the electronic dial 205 is clockwise, in step S547, the system control unit 101 increases the shutter speed value by one step toward the high-speed side in accordance with the currently-set setting level in the table of FIG. 3. In a case that the direction of rotation of the electronic dial 205 is counterclockwise, in step S548, the system control unit 101 decreases the shutter speed value by one step toward the low-speed side in accordance with the currently-set setting level in the table of FIG. 3.

In step S549, the system control unit 101 performs an update with the shutter speed changed in step S547 or S548 as a parameter for image shooting.

In step S550, the system control unit 101 updates the current shutter speed setting value and gauge displayed on the image shooting standby screen of FIG. 8A.

In step S551, the system control unit 101 determines whether the shutter speed updated in step S549 is a value that is in common with the level 1 setting (in the example of FIG. 3, 1/1000, 1/500, 1/250, or 1/125 second). When the system control unit 101 determines that the shutter speed updated in step S549 is a value that is in common with the level 1 setting, the system control unit 101 advances the processing to step S552. When the system control unit 101 determines that the shutter speed updated in step S549 is not a value that is in common with the level 1 setting but is an intermediate value, the system control unit 101 advances the processing to step S553.

In step S552, the system control unit 101 sets the torque of the electronic dial 205 controlled by the torque control unit 128 to a first value, which is greater than a second value which is for a standard case (first value>second value).

In step S553, the system control unit 101 sets the torque of the electronic dial 205 controlled by the torque control unit 128 to the second value which is for a standard case, which is less than the first value.

In step S554, the system control unit 101 controls the torque of the electronic dial 205 by the torque control unit 128 with a value set in step S552 or S553 to generate a clicking sensation during the operation of the electronic dial 205.

In step S555, the system control unit 101 resets and starts a non-operation determination timer.

By repeatedly executing the processing from step S546 to step S555 while the electronic dial 205 is being operated, a clicking sensation during rotation of the electronic dial can be produced intermittently.

Meanwhile, in step S545, when an unoperated state of the electronic dial 205 continues for a predetermined amount of time (that is, when the non-operation determination timer expires) during the processing for changing the shutter speed, the system control unit 101 ends the processing and returns to the image shooting standby state.

In the present embodiment, a method of executing a change of a shutter speed setting on a dedicated setting screen has been described; however, a configuration may be taken so as to allow the shutter speed to be directly changed by rotating the electronic dial 205 in the image shooting standby screen rather than through the dedicated screen.

According to the present embodiment, for example, by setting an amount of rotation of the electronic dial 205 necessary for changing a shutter speed setting to be equivalent regardless of the setting division, it is possible to ameliorate a sense of unnaturalness of the operation caused by a clicking sensation received by the user from the electronic dial 205 at the time of rotation of the electronic dial 205.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042780, filed Mar. 17, 2022 which is hereby incorporated by reference herein in its entirety.

What is claimed is:

1. An electronic device comprising:
    a rotational operation member;
        a first setting unit configured to set a setting level of a predetermined setting;
    a control unit configured to control a click angle and a click intensity at which to generate a click in the rotational operation member in accordance with the setting level set by the first setting unit; and
    a second setting unit configured to change a setting value of the predetermined setting for each rotation operation of the rotational operation member by the click angle, wherein the second setting unit changes the setting value to the setting value corresponding to the setting level set by the first setting unit,
    wherein the first setting unit is capable of setting a first setting level and a second setting level, and the first setting level and the second setting level include a common setting value that is settable for either setting level, and
        wherein, in accordance with the setting level, the control unit controls the click angle and controls such that the click intensity for changing the setting value to the common setting value is stronger than the click intensity for changing the setting value to a setting value other than the common setting value.

2. The device according to claim 1,
    wherein the second setting unit is capable of setting the first setting level to a level 1/3 and setting the second setting level to a level 1/2.

3. The device according to claim 1, wherein
    the control unit controls the click angle such that an angle of rotation of the rotational operation member necessary for when the setting is changed from a first common setting value to a second common setting value is the same.

4. The device according to claim 1, wherein
    when the click angle in a case of the first setting level is set to a first angle and the click angle in a case of the second setting level is set to a second angle, the control unit changes the click angle such that a value obtained by multiplying the first angle and the number of setting values that are settable in the first setting level and a value obtained by multiplying of the second angle and the number of setting values that are settable in the second setting level are equivalent.

5. The device according to claim 1, wherein
    the control unit controls the click intensity by controlling a rotational resistance to be applied to the rotational operation member for each angle of rotation.

6. The device according to claim 5, wherein
    the predetermined setting is a shutter speed,
    the click angle corresponds to a setting value for each setting level of the shutter speed,
    the setting level of the shutter speed includes a level 1/3 and a level 1/2, and
    the common setting value that is in common corresponds to a value that is in common between the level 1/3 and the level 1/2.

7. The device according to claim 1, wherein
    the electronic device is an image capturing apparatus,
    the predetermined setting is a shutter speed,
    the click angle corresponds to a setting value for each setting level of the shutter speed.

8. A method of controlling an electronic device including a rotational operation member comprising:
- setting a setting level of a predetermined setting;
- controlling a click angle and a click intensity at which to generate a click in the rotational operation member in accordance with the setting level set by the first setting unit; and
- changing a setting value of the predetermined setting for each rotation operation of the rotational operation member by the click angle, wherein the setting value is changed to the setting value corresponding to the setting level set in the setting step,
- wherein the setting step is capable of setting a first setting level and a second setting level, and the first setting level and the second setting level include a common setting value that is settable for either setting level, and
- wherein, in accordance with the setting level, the controlling controls the click angle and controls such that the click intensity for changing the setting value to the common setting value is stronger than the click intensity for changing the setting value to a setting value other than the common setting value.

9. The method according to claim 8,
wherein the changing is capable of setting the first setting level to a level 1/3 and setting the second setting level to a level 1/2.

10. The method according to claim 8, wherein
the controlling is to control the click angle such that an angle of rotation of the rotational operation member necessary for when the setting is changed from a first common setting value to a second common setting value is the same.

11. The method according to claim 8, wherein
when the click angle in a case of the first setting level is set to a first angle and the click angle in a case of the second setting level is set to a second angle, the controlling changes the click angle such that a value obtained by multiplying the first angle and the number of setting values that are settable in the first setting level and a value obtained by multiplying the second angle and the number of setting values that are settable in the second setting level are equivalent.

12. The method according to claim 8, wherein
the controlling is to control the click intensity by controlling a rotational resistance to be applied to the rotational operation member for each angle of rotation.

13. The method according to claim 8, wherein
the electronic device is an image capturing apparatus,
the predetermined setting is a shutter speed,
the click angle corresponds to a setting value for each setting level of the shutter speed.

14. The method according to claim 12, wherein the predetermined setting is a shutter speed, the click angle corresponds to a setting value for each setting level of the shutter speed, the setting level of the shutter speed includes a level 1/3 and a level 1/2, and the common setting value that is in common corresponds to a value that is in common between the level 1/3 and the level 1/2.

15. A non-transitory computer-readable storage medium storing a program for causing a processor to function as an electronic device comprising:
- a rotational operation member;
- a first setting unit configured to set a setting level of a predetermined setting;
- a control unit configured to control a click angle and a click intensity at which to generate a click in the rotational operation member in accordance with the setting level set by the first setting unit; and
- a second setting unit configured to change a setting value of the predetermined setting for each rotation operation of the rotational operation member by the click angle, wherein the second setting unit changes the setting value to the setting value corresponding to the setting level set by the first setting unit,
- wherein the first setting unit is capable of setting a first setting level and a second setting level, and the first setting level and the second setting level include a common setting value that is settable for either setting level, and
- wherein, in accordance with the setting level, the control unit controls the click angle and controls such that the click intensity for changing the setting value to the common setting value is stronger than the click intensity for changing the setting value to a setting value other than the common setting value.

\* \* \* \* \*